March 19, 1968     H. B. WHITMORE     3,373,613
PRESSURE TRANSDUCER
Filed July 26, 1966
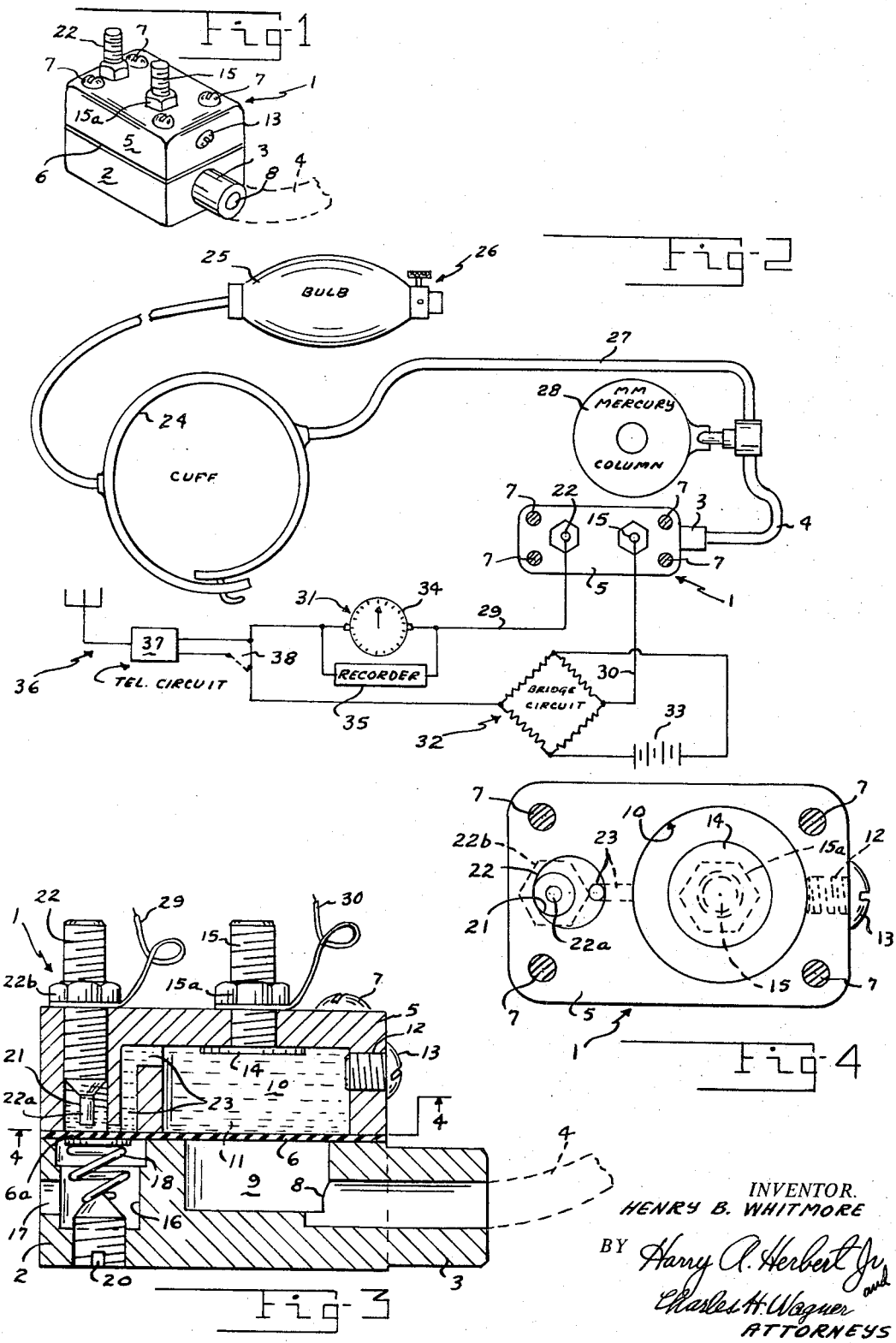
INVENTOR.
HENRY B. WHITMORE

United States Patent Office 3,373,613
Patented Mar. 19, 1968

3,373,613
PRESSURE TRANSDUCER
Henry B. Whitmore, Rte. 5, Box 369,
San Antonio, Tex. 78211
Filed July 26, 1966, Ser. No. 568,074
7 Claims. (Cl. 73—398)

The invention described herein may be manufactured and used by or for the United States Government for governmental purposes without the payment to me of any royalty thereon.

This invention relates to pressure transducers and more particularly to a pressure transducer for determining blood pressures including variable electrical resistance means for indicating blood pressures at a remote receiving station, having for an object the provision of a small, compact closed disc having an electroconductive liquid therein and responsive to blood pressures for determining actual blood pressures and rate of pulse beat, adapted to utilize the conventional constrictive "cuff," etc.

A further object of the invention is the provision of a transducer device which is diaphragm operated, containing a pressure electroconductive liquid chamber at one side of the diaphragm for receiving a variable pressure for deflecting the diaphragm, including adjustable spring means, opposing deflection of the diaphragm with means for adjusting the spring tension on the diaphragm and means adjusting the effective length of the electrical resistance path of the electroconductive liquid between two spaced electroconductive terminals in the device.

A further object is the provision of a pressure transducer employing an electroconductive fluid therein, which is simple and miniature in size, adjustable in range, light in weight, stable to moderate vibrations and temperature changes, inexpensive to manufacture and maintain, and adapted to be manufactured or converted to a variety of impedance values, and particularly useful to measure or record any pressure differentials on many high altitude tests and space flights.

A further object is the provision of means for use in recording and monitoring blood pressure changes in human subjects wearing pressure suits in altitude chambers (or in space flights) for long durations, and more particularly to measure any type of fluid pressure differential.

Other objects and advantages of the invention will become apparent from the following description and accompanying drawings in which like reference characters refer to like parts in the several figures.

Drawings

FIGURE 1 is a perspective view of the pressure transducer device incorporating the invention;

FIGURE 2 is a somewhat schematic detail plan view, illustrating one embodiment for indicating and recording the blood pressure of a human subject, including means for telemetering the pressures, for instance, to a remote location by radio, or the like;

FIGURE 3 is a longitudinal vertical sectional view through the transducer device shown in FIGURE 1; and FIGURE 4 is a detail sectional view taken about on the plane indicated by line 4—4 in FIGURE 3, looking in the direction of the arrows (and just above the diaphragm).

In the drawings the reference numeral 1 denotes the pressure transducer generally, incorporating the invention.

The transducer 1 comprises a lower body section 2 having a pressure inlet conduit or boss which is adapted to be connected to a source of variable pressure by the conduit 4.

The numeral 5 denotes an upper body section, with a flexible nonmetallic dielectric diaphragm 6 clamped between the two body sections 2 and 5 by clamping screw fasteners 7 extending through suitable holes in the upper section 5 and secured in suitable threaded bores in the lower body section 2.

The diaphragm 6 and both body sections 2 and 5 are made of dielectric material, for instance, the sections may be made of any suitable plastic such as "nylon," "Bakelite," etc.

A passage 8 extends through the conduit 3, opening into an annular pressure receiving chamber 9 below the diaphragm 6. Located in the body section 5 concentrically above the chamber 9, and the diaphragm 6, is a preferably larger annular chamber 10, closed at its bottom by the diaphragm 6.

The chamber 10 is adapted to be filled with a suitable electroconductive liquid 11 through a "filler" opening 12, closed by the filler plug 13.

Concentrically disposed in the top or roof of the chamber 10 is an electric-terminal disk 14 which is mounted on a threaded stem 15 extending upwardly through the top of the body section 5 as shown, preferably through a threaded opening, and retained by the nut 15a. The lower body section 2 is formed with a smaller annular chamber 16 opening downwardly from the top, substantially as shown, located adjacent the end of the body 5, which is remote from the pressure inlet conduit or boss 3.

The diaphragm 6 covers the upper end of the chamber 16, as well as the chamber 9, forming a second flexible diaphragm portion 6a over the chamber 16 which is vented to the exterior through the vent opening 17. The chamber 16 contains a coil or pressure spring 18 which is urged upwardly against the diaphragm portion 6a by an adjusting conical plug which is suitably threaded in a threaded opening 20 extending through the bottom of the body section or portion 2. Adjustment of the plug adjusts the upward yielding pressure of the spring 18 on the smaller diaphragm portion 6a.

The upper body portion 5, directly above the smaller diaphragm portion 6a, is "cored" or formed to provide an upwardly extending threaded opening and chamber 21 into which is threaded a second electric-terminal stem 22, adjustable vertically, and having a smaller contact terminal end 22a establishing electrical contact with the electroconductive liquid 11 through the small passageway 23 as shown, extending between the base of the larger liquid chamber 10 and the smaller liquid chamber 21, above the diaphragm 6 substantially as shown.

The terminal stem 22 is adjustable vertically in the upper body block 5 to adjust the effective conductive length in the electroconductive liquid 11 between the terminals 22a and 14, and is retained in adjustment by the nut 22b. Of course, suitable "packing seals" (not shown) may be provided where desired, for instance, to prevent leakage of the electroconductive fluid 11 between the chambers 10 and 21 and past the stems 22, 15, and the filler plug 13.

With reference to FIGURE 3 it will be observed that when the chambers 10 and 21 and the communicating passage 23 are filled with a suitable electroconductive liquid, such as indicated at 11, which may be any well-known electroconductive liquid, such as a weak acid solution such as (diluted) sulphuric acid, a weak alkali solution, or a colloidal solution of silver, or even liquid mercury, the examples mentioned being merely exemplary of some that may be used, a variable electroconductive path can be established between the terminals 14 and 22a when the terminal stems 15 and 22 are connected to an energizing electrical circuit, as seen in FIGURE 2, and the diaphragm 6 is moved or vibrated by variations in pressure in the chamber 9.

Thus it will be seen that when the diaphragm 6 is deflected upwardly by pressure introduced into the chamber 9, a portion of the electroconductive liquid 11 in the chamber 10 above the diaphragm 6 is displaced through the passage 23 into the smaller chamber 21. This deflects the smaller diaphragm portion 6a downwardly against the tension of the return spring 18. This increases the cross-sectional area of the conductive liquid between the electric-terminals 14 and 22a and consequently increases the intensity of voltage (decreases the resistance) in the circuit connected to the terminal stems 22 and 15. If a voltmeter type of indicator or recorder is connected in the circuit it will indicate, or determine, the variations in the voltage, and properly calibrated will indicate the variations in the pressures in the chamber 9.

One adaption for measuring blood pressure is illustrated schematically in FIGURE 2 in which the reference numeral 24 denotes the usual inflatable "cuff" which is inflated, after being around the subject's arm, by the bulb 25 having the conventional valve and pressure release means 26. The pressure outlet from the cuff 24 includes the hose 27 which is connected through the usual calibrated mm. mercury indicator column 28 to the conduit 4 leading to the transducer device 1.

The terminals 15 and 22 are connected by conductors 29 and 30 to the telemetering circuit 31 which may be of conventional type, including the "bridge" 32 supplied by the battery 33.

Variations in the bridge circuit caused by changes in the electric potential through the electroconductive liquid 11 between the terminals 15 and 22, as previously described, are indicated by the indicator 34 and such resistance variation may be recorded by a suitable recorder 35, if desired.

If the remote telemetering of the pressure variations to a remote receiving station is desired a conventional remote telemetering circuit and device indicated at 36 may be provided having a transmitter 37 with a switch 38 for coupling the transmitter 37 in the circuit, whereby the variations of the blood pressure of the human subject wearing the cuff 24 can be "picked up" and recorded at a remote point.

For purposes of exemplification, a particular embodiment of the invention has been shown and described to the best understanding thereof. However, it will be apparent that minor changes and modifications in the arrangement may be resorted to without departing from the true spirit and scope of the invention as defined in the accompanying claims.

I claim:

1. A pressure transducer comprising a dielectric casing having an upper body portion, a lower body portion, a flexible dielectric diaphragm clamped between the upper and lower body portions, said lower body portion having an annular fluid pressure chamber therein opening downwardly, closed at its upper end by a first portion of said diaphragm and a pressure fluid inlet conduit from the exterior, opening into said fluid pressure chamber, adapted to be connected to a fluctuating fluid pressure, said lower body portion having a smaller spring chamber extending downwardly therein in spaced parallel relation to the fluid pressure chamber closed at its upper end by a second portion of said flexible dielectric diaphragm, compression spring means in said spring chamber yieldably impinging said second diaphragm portion for urging the same upwardly, spring adjusting means in said lower body portion for adjusting the impinging pressure of said spring means against said second diaphragm portion for deflecting the same upwardly, said upper body portion having an annular electro-conductive liquid receiving chamber therein extending upwardly from and closed by said first diaphragm portion in concentric opposed relation to said fluid pressure chamber, an electric contact terminal concentrically fixed in said annular electroconductive liquid receiving chamber in spaced relation above said first diaphragm portion, said upper body portion having a second smaller electroconductive liquid receiving chamber therein extending upwardly from and closed by said second diaphragm portion, a second electric contact terminal adjustably fixed in said second electroconductive liquid receiving chamber, extending downwardly into predetermined spaced relation above said second diaphragm portion, said upper body portion having an electroconductive liquid passage formed therein extending between said first-mentioned electroconductive liquid chamber and said smaller second electroconductive liquid chamber in predetermined closely spaced relation to said second diaphragm portion arranged to be increased and decreased in cross-sectional area by downward and upward deflection of said second diaphragm portion by movement of an electroconductive liquid when contained in said liquid chambers, for varying said cross-sectional area of the electroconductive liquid between said liquid chambers to vary the electric potential between said electric contact terminals in said electroconductive liquid chambers.

2. A variable pressure electric transducer comprising, a closed dielectric casing having an upper body portion and a lower body portion, said lower body portion having an annular variable fluid pressure receiving chamber therein opening downwardly away from said upper body portion, a flexible dielectric first diaphragm portion between said body portions closing the top of said variable fluid pressure receiving chamber, said lower body portion having a variable fluid pressure inlet conduit from the exterior, opening into said variable fluid pressure receiving chamber adapted to receive a variable fluid pressure therethrough, said lower body portion having a smaller spring receiving second chamber extending downwardly therein away from said upper body portion in displaced relation to said variable fluid pressure receiving chamber, a flexible dielectric second diaphragm portion closing the upper end of said spring receiving chamber, compression spring means in said spring chamber impinging said second diaphragm portion for deflecting said second diaphragm portion upwardly, said upper body portion having an annular electroconductive liquid receiving and containing chamber formed therein extending upwardly from and closed by said first diaphragm portion in substantially concentric opposed relation to and opposite said variable fluid pressure chamber, said upper body portion having a second smaller electroconductive liquid container chamber therein in substantially concentric opposed relation to said spring means at the opposite side of said second diaphragm portion, said upper body portion having a partition wall therein intermediate said smaller and larger electroconductive liquid receiving chambers terminating in said smaller electroconductive liquid receiving chamber in predetermined closely spaced relation to said second diaphragm portion, an electroconductive liquid receiving passage formed in said upper body portion extending between the upper portion of the larger electroconductive liquid receiving chamber and the space between said partition wall and said second diaphragm portion whereby when said electroconductive liquid receiving chamber contains an electroconductive liquid, downward deflection of said second diaphragm portion by the electroconductive liquid by upward deflection of said first diaphragm portion increases the cross-sectional area of the electroconductive liquid in said space between the lower end of said partition wall and the second diaphragm portion, and upward deflection of said second diaphragm portion by said spring means displaces the conductive liquid from said smaller chamber and decreases the cross-sectional area of the conductive liquid in the space between the partition wall and the second diaphragm portion to increase the electrical resistance therein, a first electric contact terminal fixed in the first-mentioned electroconductive liquid receiving and containing chamber, a second electric contact terminal disposed in said smaller electroconductive liquid chamber in predetermined space relation to said second diaphragm portion.

3. A device as set forth in claim 2 in which said second electrical contact adjustable in said smaller electroconductive liquid receiving chamber toward or away from said second diaphragm portion to decrease or increase the effective length of the electroconductive path of an electroconductive liquid from said second electric-terminal to said first electrical contact terminal.

4. A device as set forth in claim 3 including spring adjusting means in said lower body portion for adjusting the impinging spring tension of said spring means on said second diaphragm portion.

5. A pressure transducer comprising a casing having an upper body portion, a lower body portion, a flexible diaphragm member clamped between said upper and lower body portions, said lower body portion having a fluid pressure chamber therein opening downwardly, closed at its upper end by said diaphragm member and a pressure fluid inlet conduit from the exterior in communication with said fluid pressure chamber adapted to be connected to a fluctuating fluid pressure, said lower body portion having a spring chamber extending downwardly therein in isolated relation to said fluid pressure chamber and closed at its upper end by said diaphragm member, spring means in said spring chamber yieldably impinging said diaphragm member to yieldably urge the diaphragm member located above said spring means upwardly, said upper body portion having an electroconductive liquid receiving chamber extending upwardly from and closed by said diaphragm member in opposed concentric relation to said fluid pressure chamber, an electrical contact terminal fixed in said electroconductive liquid receiving chamber in spaced relation above said diaphragm member, said upper body portion having a smaller electroconductive liquid receiving chamber extending upwardly therein from said diaphragm member in opposed relation to said spring chamber, a second electrical contact in said smaller chamber, an electroconductive liquid receiving passage extending between said first-mentioned chamber and said smaller chamber having a restrictive communicating area into said smaller chamber between said upper body portion and said diaphragm member which is variable in cross-sectional area by upward and downward deflections of said diaphragm member, whereby increased pressure in said fluid pressure chamber deflects upwardly said diaphragm member, for closing said fluid pressure chamber, to displace outwardly an electroconductive liquid when contained in said electroconductive liquid chamber through said electroconductive liquid passage and said restrictive cross-sectional area into said smaller electroconductive liquid chamber to deflect said diaphragm for said smaller electroconductive liquid chamber downwardly against the impinging spring pressure to increase the said restricted inlet cross-sectional area, and reduction of pressure in said fluid pressure chamber relieves pressure on the electroconductive liquid to cause said spring means to displace some of the electroconductive liquid from the smaller chamber to allow said spring means to deflect the diaphragm member in the smaller chamber upwardly to reduce the cross-sectional restrictive inlet area of the electroconductive liquid in the passage and increase the electrical resistance in said liquid between said electrical contacts.

6. Apparatus as set forth in claim 5 in which said upper and lower body portions are clamped together and includes a flexible dielectric packing layer which is clamped between the two body portions, extending across the chambers to form said diaphragm members.

7. An electric transducer device comprising an elongated dielectric body, annular pressure and electroconductive liquid receiving chambers formed in one portion of the body in opposed concentric relation, a dielectric flexible diaphragm portion disposed between and separating said annular chambers, opposing substantially concentric separate annular smaller spring pressure and electroconductive liquid receiving chambers formed in another portion of said body in spaced substantially parallel relation to the first-mentioned chambers, a smaller dielectric flexible diaphragm portion separating said smaller chambers from each other, an electroconductive liquid passage in said body connected between the larger and said smaller electroconductive liquid receiving chambers to establish electroconductive liquid communication therebetween, said passage having an open side portion facing said smaller diaphragm portion in predetermined closely spaced relation to said smaller diaphragm portion, spring means in said spring chamber impinging said smaller diaphragm portion for yieldably urging said smaller diaphragm portion toward said smaller electroconductive liquid receiving chamber and said open side portion of said passage for decreasing the cross-sectional area of said passage at the open side portion thereof, adjusting means in said body for adjusting the tension of said spring means on said smaller diaphragm portion, an electric contact member in said body adjustable in said smaller electroconductive liquid receiving chamber toward and away from said smaller diaphragm member having an electroconductive liquid contact terminal adjustable thereby toward and away from said smaller diaphragm member, a second electroconductive liquid contact electric terminal fixed in the larger electroconductive liquid receiving chamber, said body having a vent passage from said spring chamber to the exterior, a fluid pressure inlet conduit from the exterior of the device in communication with the first-mentioned annular pressure chamber, and an electroconductive liquid sealed in said smaller and larger electroconductive liquid receiving chambers in contact with said fixed and adjustable electric contact terminals in said chambers.

References Cited
UNITED STATES PATENTS 2,856,775  10/1958  Niles _____ 73—398

LOUIS R. PRINCE, *Primary Examiner.*

DONALD O. WOODIEL, *Assistant Examiner.*